United States Patent [19]
Hilliker et al.

[11] Patent Number: 5,411,360
[45] Date of Patent: May 2, 1995

[54] APPARATUS FOR TRANSPORTING SHEET MATERIAL

[75] Inventors: Lon R. Hilliker, Rockford, Mich.; John P. Malley, Cedar Falls, Iowa

[73] Assignee: Libbey-Owens-Ford Co., Toledo, Ohio

[21] Appl. No.: 138,921

[22] Filed: Oct. 19, 1993

[51] Int. Cl.⁶ ............................................. B60P 1/02
[52] U.S. Cl. ................................ 414/608; 414/498; 414/495; 414/589; 254/93 HP; 108/53.5; 280/442
[58] Field of Search ............ 414/608, 495, 498, 903, 414/589, 590, 607; 254/93 R, 93 HP; 280/477, 478.1, 490.1, 400, 442, 553; 187/9 R; 220/1.5; 108/51.1, 53.1, 53.5, 56.1, 56.3; 211/13, 49.1, 194

[56] References Cited

U.S. PATENT DOCUMENTS

| | | | |
|---|---|---|---|
| 1,745,959 | 2/1930 | Steiner | 254/93 HP X |
| 1,836,362 | 12/1931 | Crowley | 414/608 X |
| 3,095,987 | 7/1963 | Sable | 414/495 X |
| 3,669,292 | 6/1972 | Tuura | 254/93 HP X |
| 3,857,494 | 12/1974 | Giardini | 108/53.5 X |
| 3,979,864 | 9/1976 | Tillié | 414/10 X |
| 4,258,631 | 3/1981 | Brown | 108/53.5 X |
| 5,012,879 | 5/1991 | Bienek et al. | 414/495 X |

FOREIGN PATENT DOCUMENTS

| | | | |
|---|---|---|---|
| 759311 | 5/1967 | Canada | 414/495 |
| 1532545 | 6/1968 | France | 414/498 |
| 2450906 | 11/1980 | Germany | 108/56.1 |
| 2024167 | 1/1980 | United Kingdom | 254/93 HP |
| 1558729 | 4/1990 | U.S.S.R. | 414/495 |

*Primary Examiner*—Frank E. Werner
*Attorney, Agent, or Firm*—Marshall & Melhorn

[57] ABSTRACT

A system is provided for transporting large glass sheets or blanks. A-frame stanchions are removably secured to a base section to form a rack for carrying stacks of sheets supported on edge upon the base. The base section is supported above the floor or supporting surface by spacer sections which define a corridor beneath the base for removably receiving a transport dolly. The transport dolly includes lift platforms positionable beneath frame members of the base section. Inflatable air bags are adapted to raise and lower the lift platforms for selectively raising the rack to permit it to be moved about on the transport dolly. A steerable wheel arrangement is provided at the forward end of the transport dolly. Stacking posts are provided at the corners of the base whereby when empty, the A-frame stanchions can be disassembled and the racks stacked in nested relationship for return shipment and storage.

7 Claims, 4 Drawing Sheets

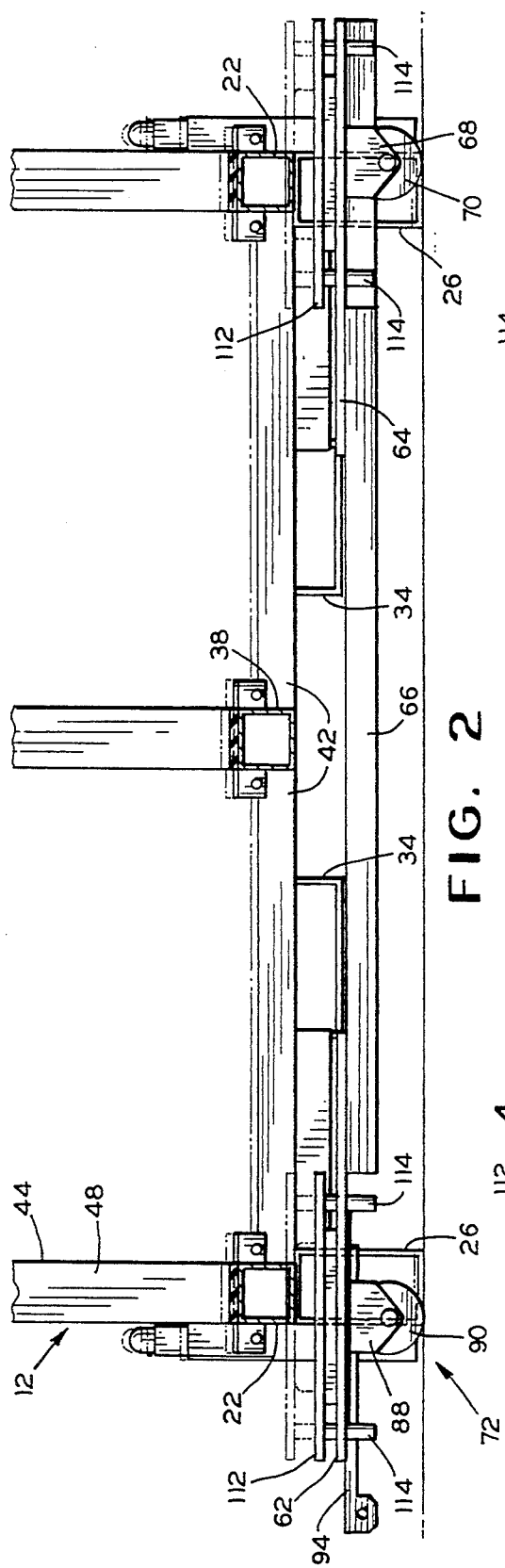
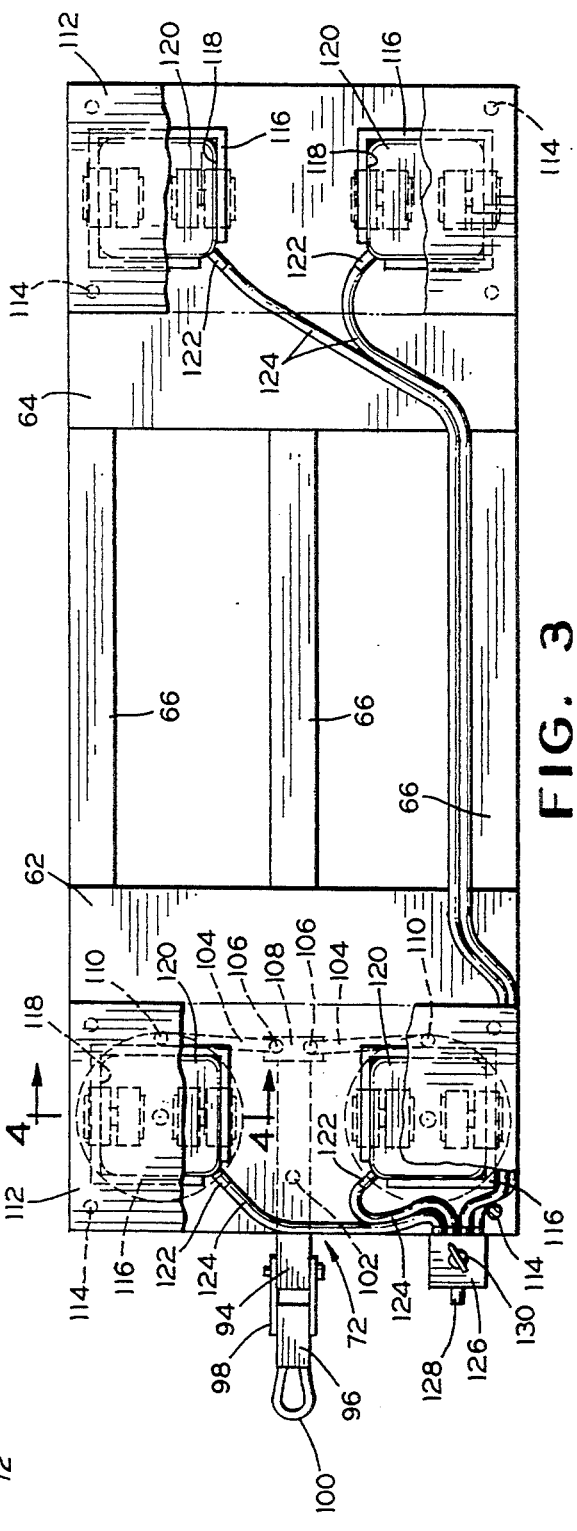

APPARATUS FOR TRANSPORTING SHEET MATERIAL

BACKGROUND OF THE INVENTION

1. Field of the Invention

This invention relates generally to the transporting of large glass sheets or blanks, and more particularly to a system for the handling and transporting of such sheets in bulk between a production facility, a warehouse or distribution point and a customer or job site.

2. Description of the Prior Art

For some time flat glass has been produced by processes wherein a continuous ribbon or sheet of glass is formed, and the continuously advancing ribbon is cut into units or blanks of desired sizes. In earlier times these blanks, which were of relatively small dimensions, were packed in wooden cases for shipment to distributors and end users. Such cases, due to their relatively small size, could be handled by conventional fork lift units and dollies and transported in conventional rail cars and trucks. More recently it has become desirable to ship glass from the factory to wholesalers and jobbers in relatively large sizes so that the recipients can efficiently cut needed sizes from the large blanks and minimize the amount of glass wasted in the cutting process. Heretofore these large sheets or blanks have generally been transported on A-frame racks carried on railroad cars or truck trailers. Due to the dimensions of the glass sheets, the A-frame racks on which they were carried could not be readily handled by fork lift units or other dolly type carriers. It was necessary to move the A-frame racks about the factory and load them onto the transport units, either highway trailers or rail cars, by means of an overhead crane. This necessitates that the transport unit be of a flat bed or open top type, and thus substantially limits the number of units which are available for transporting the loaded racks. It may even be necessary to employ transport units dedicated to the carrying of the loaded racks, which is costly and inefficient. Of course, it is also necessary that the recipient of the shipment have available an overhead crane for unloading the loaded racks from the transport unit, and many recipients do not have available such equipment of adequate capacity.

SUMMARY OF THE INVENTION

In accordance with the present invention, there is provided a system for transporting relatively large flat glass sheets between a production facility and a storage facility or job site. Virtually any type vehicle, including enclosed vans, may be employed in shipping the glass sheets between sites. The invention also may advantageously be utilized in transporting and storing glass sheets within a warehouse or processing facility so as to provide an integrated system for handling flat glass sheets from production to processing and delivery at a job site.

A-frame stanchions are removably secured to a base section to form a rack for carrying stacks of sheets supported on edge upon the base. The base section is supported above the floor or supporting surfaces by spacer sections which define a corridor beneath the base for removably receiving a transport dolly. The transport dolly includes lift platforms positionable beneath frame members of the base section. Inflatable air bags are adapted to raise and lower the lift platforms for selectively raising the rack to permit it to be moved about on the transport dolly. A steerable wheel arrangement is provided at the forward end of the transport dolly. Stacking posts are provided at the corners of the base whereby when empty, the A-frame stanchions can be disassembled and the racks stacked in nested relationship for return shipment and storage.

It is thus an object of the invention to provide a system for transporting large sheets of glass without costly specialized equipment.

It is another object of the invention to provide a system wherein large sheets of glass can be transported in conventional enclosed van type over-the-road vehicles.

Another object of the invention is to provide a system wherein storage racks carrying large sheets of glass can be loaded onto and unloaded from transport units without an overhead crane.

Still another object is to provide an integrated system for handling glass sheets within production, storage and fabrication facilities and at a job site without the necessity for expensive specialized handling equipment.

other objects and advantages of the invention will become more apparent during the course of the following description, when taken in connection with the accompanying drawings.

BRIEF DESCRIPTION OF THE DRAWINGS

In the drawings, wherein like numerals refer to like parts throughout:

FIG. 2 is a side elevational view, partially in section, of the assembled base portion and transport dolly of the invention;

FIG. 3 is a top plan view of the dolly, with parts broken away;

DESCRIPTION OF THE PREFERRED EMBODIMENT

Figure 1:
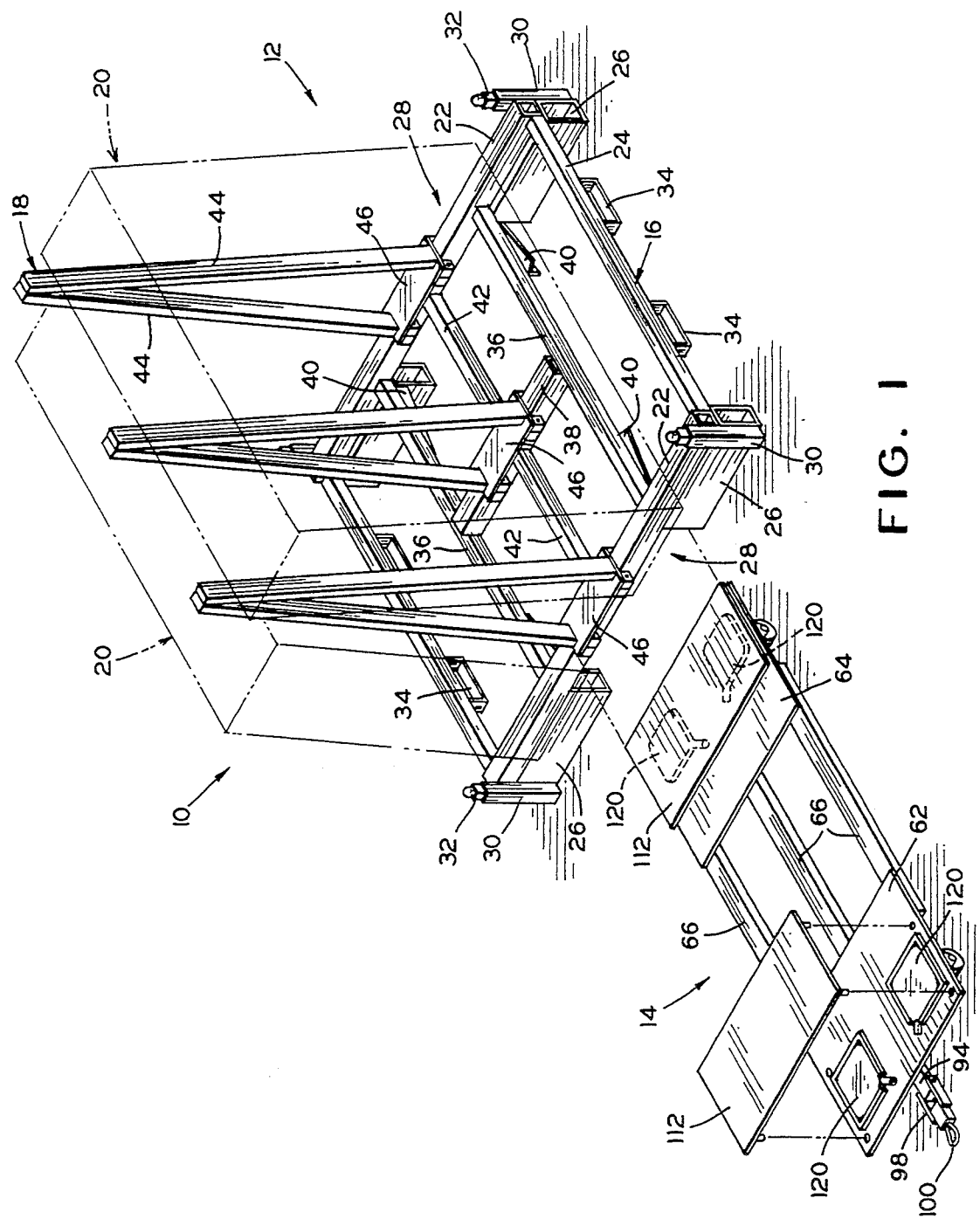
FIG. 1 is a perspective view, partially exploded, of the sheet storage and transporting apparatus of the invention.

With reference now to the drawings, and in particular to FIG. 1 thereof, there is illustrated generally at 10 an apparatus embodying the invention and including an A-frame rack 12 and a transport dolly 14 for selectively raising and transporting the rack. The rack comprises a generally square or rectangular base 16 adapted to have removably secured thereto a plurality of upstanding a-frame stanchions 18. Individual sheets of material standing on edge upon the base 16 on either side of the stanchions lean against the stanchions to form stacks of material as illustrated in phantom at 20.

Figure 7:
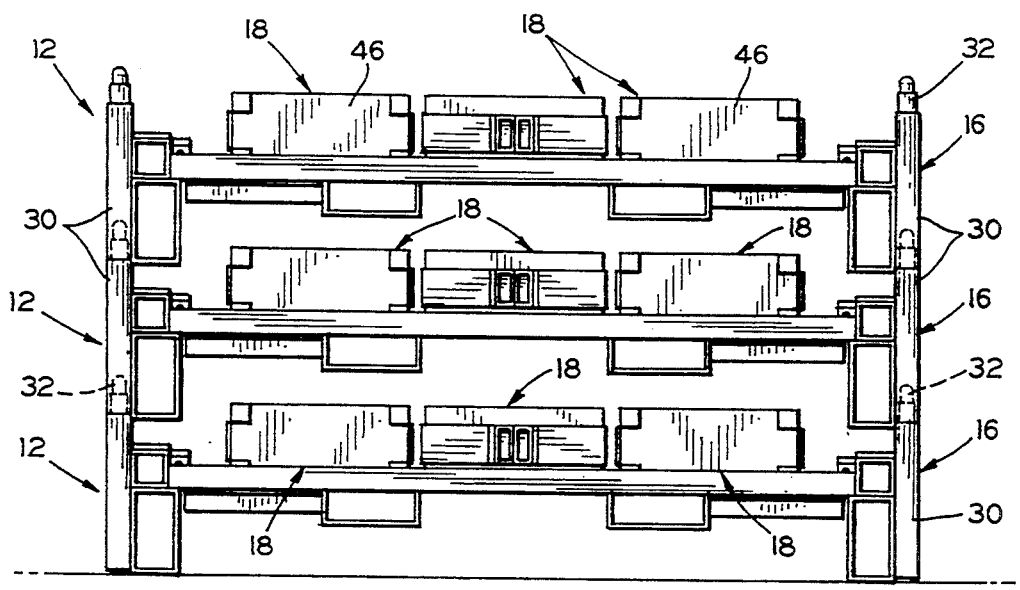
FIG. 7 is a side view illustrating a plurality of disassembled racks stacked in nested relationship for return shipment.

The base 16 may be of welded tubular construction and includes opposite end numbers 22 interconnected by side members 24. Spacer sections 26 are provided beneath the end members to elevate the base above the floor or other supporting surface and define a corridor 28 therebetween for entry of the transport dolly 14 as will be hereinafter described. Upstanding posts 30 affixed at the corners of the base have stacking caps 32 at their upper ends adapted to be received in the open lower ends of the corner posts of similar racks for stacking empty racks in nested relationship as illustrated in FIG. 7, and as will be hereinafter described. Spaced pairs of brackets 34 affixed beneath the side members 24 define pockets adapted to receive the forks of a conventional fork lift unit (not shown) for transporting empty racks and nested stacks of racks.

Interior longitudinal support members 36 extend between the opposite end members 22 for carrying an intermediate support beam 38 upon which an intermediate one of the A-frame stanchions is mounted. The support members 36 are positioned along either side of the corridor 28 adapted to receive the transport dolly 14. Pairs of angularly directed guide elements 40 are affixed to the underside of the support members 36 for directing the end of the dolly into position between the spacer sections 26 and properly aligning the dolly within the corridor 28. The guide elements may advantageously comprise sections of angle stock with one leg of each angle extending downwardly and oriented so that legs of opposed pairs of guide elements converge toward the space between the spacer sections 26 and guide the remote end of the dolly into proper alignment beneath the rack 12. Longitudinal braces 42 extend between the center support beam 38 and the opposite end members 22.

Figure 6:
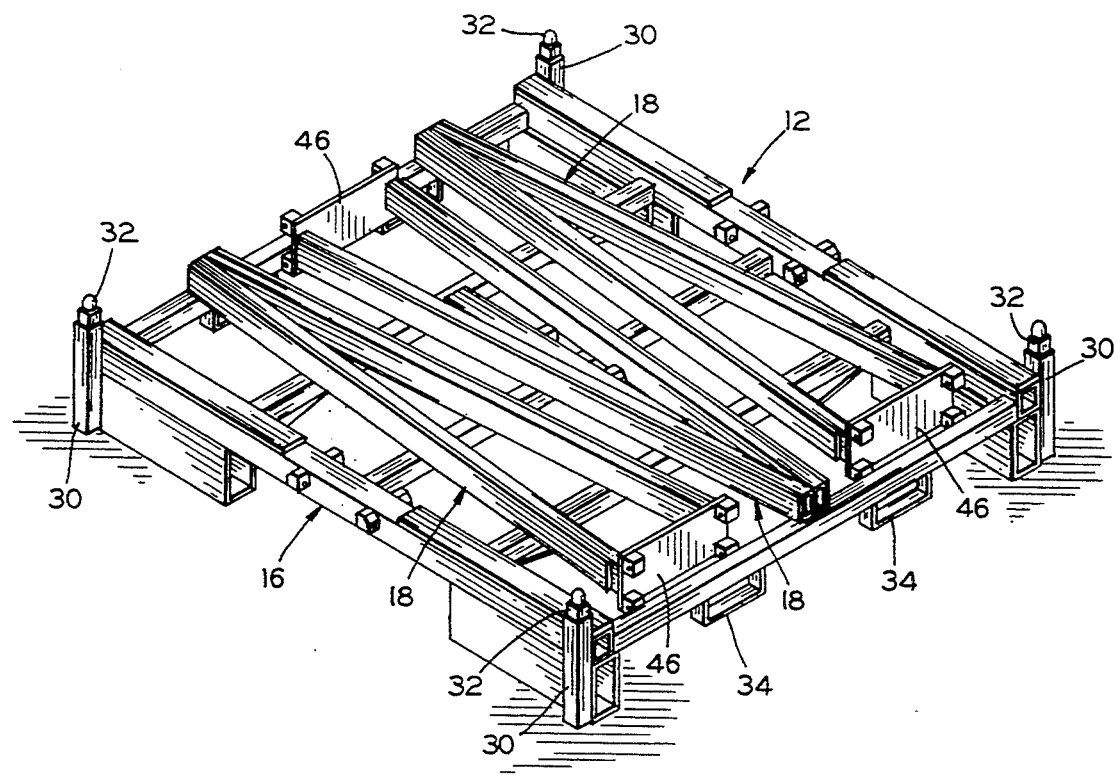
FIG. 6 is a perspective view of the rack of the invention with the stanchions in the storage position.

In order to facilitate return shipment and storage of empty racks, the A-frame stanchions 18 are removably affixed to the base 16 of the rack so that they can be readily disassembled for storage on the base as shown in FIG. 6. To that end, each stanchion 18 comprises a pair of support beams 44 affixed at one end in spaced relationship to a base plate 46. The beams converge toward their opposite ends and are suitably interconnected as by welding to form a rigid A-frame structure. Protective strips 48 of a resilient material such as rubber or felt are affixed to the surfaces of the support beams 44 facing the glass sheets for preventing injury to the glass. Similar strips 50 are provided on the appropriate surfaces of the end members 22 and the center support beam 38 upon which the glass sheets are stacked on edge.

Figure 5:
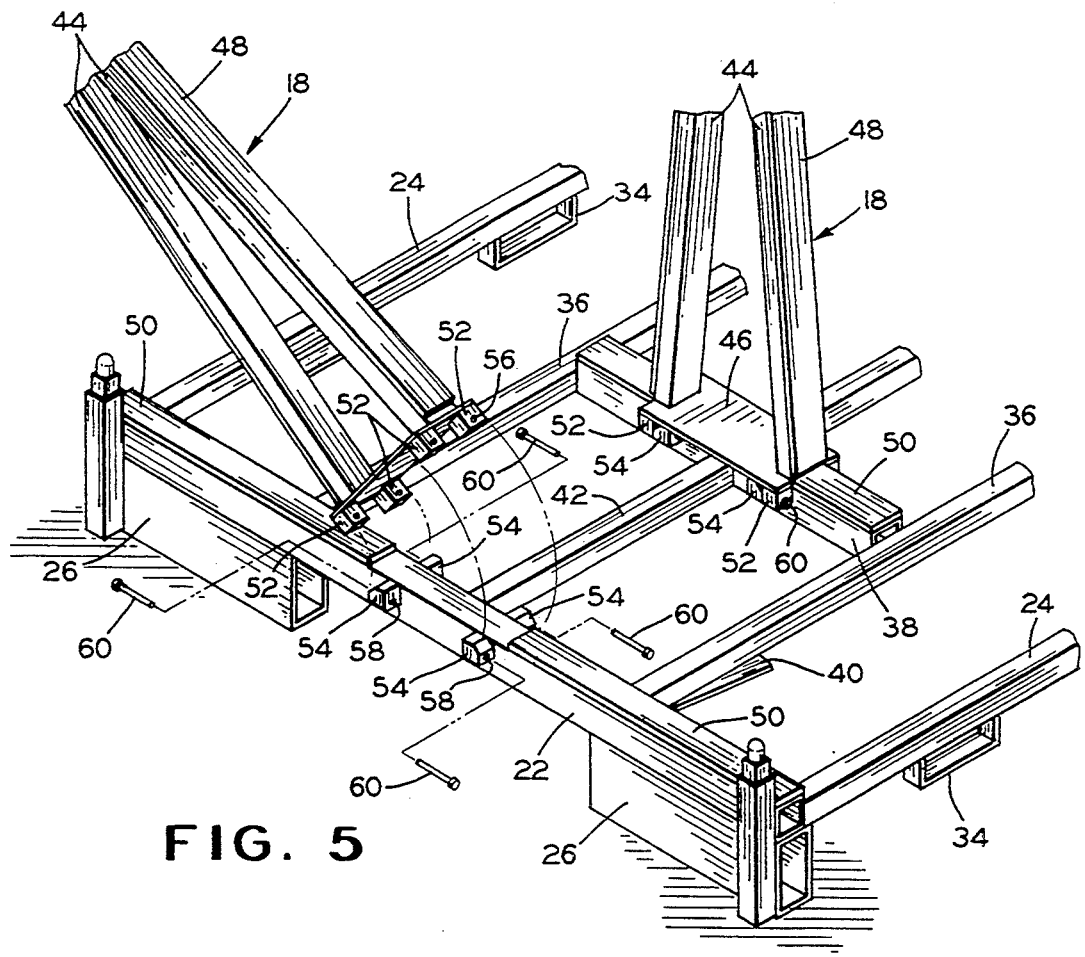
FIG. 5 is an enlarged, fragmentary, partially exploded view illustrating the manner in which the stanchions are removably affixed to the base of the rack.

As best seen in FIG. 5, cooperating fastener blocks 52 and 54 are mounted upon the underside of the base plate 46 and opposite sides of the end members 22 and center support beam 38, respectively. Openings 56 and 58 extend through the blocks 52 and 54, respectively, for removably receiving suitable lock pins 60 to secure the A-frame stanchions to the base 16. The fastener blocks 54 may be provided with bevelled surfaces 62 to facilitate positioning of the stanchions upon the end members 22 and center support beam 38. The end members and center support beam are so constructed as to interchangeably accommodate the stanchions. As will be readily apparent the stanchions may be quickly and easily mounted upon the base to permit stacking of glass sheets thereon as illustrated in FIG. 1. Upon unloading of the rack, the A-frame stanchions can be disconnected by removing the lock pins 60 and placed in the storage position as shown in FIG. 6. The corner posts 30 and stacking caps 32 enable the disassembled racks to be stacked one upon another in nested relationship as shown in FIG. 7 for economy in storage and return shipment.

The transport dolly or jack 14, as best seen in FIGS. 1 and 2, is adapted to be inserted beneath the base 16 within the corridor 28 and along the longitudinal axis of the rack for raising the rack from the supporting surface. The dolly, carrying the rack, can then be towed or pushed by a suitable motorized unit (not shown) to move the loaded rack as desired. To that end, the dolly 14 comprises front and rear carrier plates 62 and 64 interconnected by frame members 66. U-shaped brackets 68 having pairs of caster wheels 70 rotatably journaled therein are mounted on the underside of the rear carrier plate, preferably in a position so as to be approximately beneath the end member 22 with the dolly in the transport position.

Figure 4:
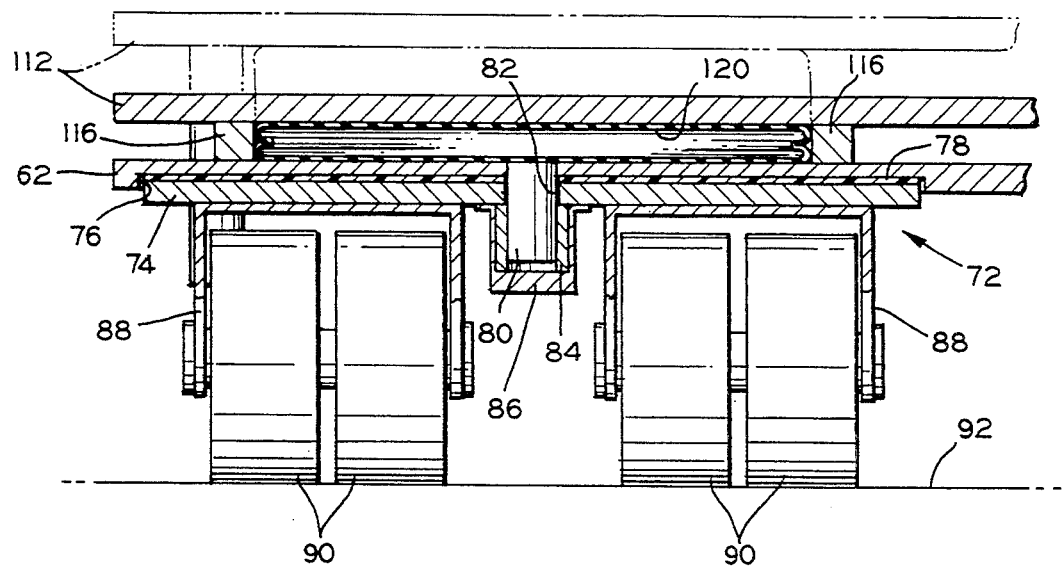
FIG. 4 is a vertical section taken substantially along line 4—4 of FIG. 3.

A steerable caster arrangement, identified generally at 72, is provided beneath the front carrier plate 62. As shown in FIGS. 3 and 4, circular swivel caster plates 74 are seated in correspondingly shaped recesses 76 formed in the lower face of the front carrier plate 62. In order to permit the caster plates to freely rotate within the recess when loaded, a suitable bearing device such as a sheet 78 of polyethylene bearing material is disposed within the recess between the swivel caster plate and the under surface of the carrier plate 62. One suitable material is available commercially under the name TIVAR SL. A king pin 80 affixed to the carrier plate 62 extends through an opening 82 at the center of the swivel castor plate 74 and is journaled in a bushing 84 carried in a bearing cup 86 affixed beneath the caster plate. Thus the caster plate is adapted to pivot about the king pin while engaging the sheet bearing 78. U-shaped brackets 88 having pairs of caster wheels 90 journaled therein are affixed beneath the swivel caster plates 74 for rollingly carrying the forward end of the dolly upon a supporting surface 92.

A tongue 94 is affixed to the front carrier plate 62 intermediate the swivel caster plates 74 for attaching the transport dolly to a towing vehicle. The tongue additionally is coupled to the swivel caster plates for rotating caster plates to steer the dolly as it is pushed or pulled by the vehicle. To that end, as will be seen in FIG. 3 a tow bar 96 may be connected to the tongue as by a hinge member 98, with the tow bar having a suitable coupler 100 for connecting the tongue to the towing vehicle (not shown). The towing vehicle may, for example, be a conventional fork lift unit such as commonly available in production, warehousing and shipping facilities. The tongue is affixed to the carrier plate 62 by a pivot member 102 for pivoted, swinging movement thereabout. Tie bars 104 are pivotably connected at 106 to a connecting plate 108 affixed to the rear of the tongue, and at 110 to the respective swivel caster plates 74. Thus, as will be readily apparent, as the tongue 94 is pivoted about the member 102, the swivel caster plates and the caster wheels 90 thereon will simultaneously pivot about their respective king pins 80 for steering the transport dolly as it is pushed or pulled by the towing vehicle.

The transport dolly 14 includes an air jack system for raising the rack 12 and transferring support of the rack on the supporting surface 92 from the spacer sections 26 to the pairs of caster wheels 70 and 90. The rack is raised sufficiently to separate the spacer sections from the supporting surface so that the rack can be freely moved about on the transport dolly and deposited in a selected area. The air jack system comprises a lift platform 112 disposed above each of the front and rear carrier plates 62 and 64 for positioning beneath the respective end members 22 of the rack 12. Vertical guide posts 114 affixed to the lift platform extend downwardly through mating openings in the associated carrier plates and are adapted to freely move up and down through the openings along their longitudinal axes so as to confine the platforms to movement along reciprocating paths normal to the planes of the carrier plates and platforms.

Bars 116 affixed to the upper surfaces of the front and rear carrier plates define air bag cavities 118, preferably disposed over each of the sets of caster wheels 70 and 90. An air bag 120 having a configuration complementary to the cavity is seated within each of the cavities. As will be seen in FIGS. 1 and 3, the bars surround and enclose the perimeter of the cavity except for a short gap at one of the corners through which a stem 122 for inflation of the air bag extends. Each stem is connected by means of a line 124 to an inflating manifold 126, conveniently mounted as at the forward end of the transport dolly on the carrier plate 62. As will be hereinafter explained, it is desirable that the air bags be capable of simultaneous inflation to a uniform pressure, and that in use each of the air bags be isolated so that pressurized fluid may not be transmitted from one to another. To that end, the inflation manifold may suitable be of the type including a valve stem 128 adapted for ready connection to a supply (not shown) of compressed air. The valve stem communicates with the manifold wherein, by means of a valve manually controlled by a lever 130, the lines 124 to each of the air bags may alternatively be placed in communication with the manifold, and hence with the valve stem 128, or be isolated from the manifold whereby the air bags are isolated from one another.

By way of example, a transport dolly 14 of preferred construction may be designed for a total lift capacity of 30,000 pounds, that is, the lift platforms 112 will each apply a lifting force of 15,000 pounds to an end member 22. Each of the four air bags is ten inches square, with a deflated thickness of 0.7 inch. The air bags thus have a pressure applying area of about 100 square inches each, with a maximum lifting capacity of about 9600 pounds per bag. In order to achieve their maximum lifting capacity, an air supply, or shop air system of about 100 pounds per square inch would be required. However, to achieve design capacity the bags would need only to be inflated to a pressure of about 75 pounds per square inch.

Briefly reviewing operation of the invention, with the A-frame stanchions assembled on the base 16, sheets are stacked on edge on the base and leaning against the stanchions to form the stacks 20. The completed stacks may be secured on the rack in the conventional manner as by banding straps or shrink wrap packaging. The transport dolly 14, with the air bags 120 in their uninflated condition, is maneuvered into position within the corridor 28 beneath the rack, and with the lift platforms 112 beneath the end members 22 of the base 16. A suitable source of compressed air, typically a plant compressed air distribution system or a local air compressor, is connected to the valve stem 128 of the inflating manifold 126. The valve lever 130 is positioned to place the individual lines 124 in communication with the manifold, and the air bags 120 are simultaneously inflated to a suitable common pressure. The manifold may be provided with a conventional pressure gauge (not shown) for visibly indicating the common pressure.

As the pressurized air bags expand they apply force to and lift the platforms 112 upwardly into engagement with the end members 22. When the pressure in the air bags reaches an adequate level the bags will lift the platforms and the loaded rack from the solid line, resting position to the raised, transport position as shown in broken lines in FIGS. 2 and 3. The actual pressure required will, of course, depend upon the weight of the loaded rack. For a fully loaded rack in accordance with the aforedescribed exemplary embodiment, the pressure will be on the order of 75 pounds per square inch.

When the rack has been raised so that the spacer sections 26 are sufficiently separated from the supporting surface 92, the air supply to the valve stem 128 is disconnected and the lever 130 on the inflating manifold is moved to the position isolating the individual air bags 120 from the manifold. Such isolation of the air bags from one another prevents transfer of air from one bag to another in response to the shifting of weight as the rack is moved.

The dolly is connected to a traction vehicle by means of the tow bar 96 and the coupler 100, and the dolly and loaded rack are moved as desired, for example to a loading dock for loading endwise into an enclosed highway trailer. For such loading the dolly is pushed by the traction vehicle, with the steerable wheel arrangement 72 providing for steering of the dolly to suitably position the rack. With the rack in position, the lever 130 is shifted to place the air bags in communication with the manifold, and the bags are deflated by releasing air through the valve stem 128. The dolly 14 is then withdrawn from the corridor 28 in preparation for transport of another rack. A similar dolly is provided at the unloading point, and the rack is removed from the transport vehicle by reversing the procedure. The loaded rack is transferred to a storage area or positioned for removal of the sheets from the rack. Following removal of the sheets, the stanchions 18 can be disassembled and stored, and the racks can be stacked in nested relationship for return shipment as illustrated in FIGS. 6 and 7.

It is to be understood that the form of the invention herewith shown and described is to be taken as an illustrative embodiment only of the same, and that various changes in the shape, size and arrangement of parts may be resorted to without departing from the spirit of the invention.

What is claimed is:

1. A system for transporting sheets of material comprising a rack including a base section, the base section including a framework comprising opposite transversely extending first and second end members interconnected by longitudinally extending side members, a separated pair of spacer sections disposed beneath each said end member for maintaining said base section spaced from a supporting surface, the separated spacer sections beneath the opposite end members defining a corridor beneath the base section, and a wheeled transport dolly adapted for reception with the corridor beneath the base section, the transport dolly including a front lift platform positioned beneath the first end member and a rear lift platform positioned beneath the second end member with the transport dolly positioned within the corridor, a front carrier plate, a rear carrier plate, frame members interconnecting the front and rear carrier plates, the front and rear lift platforms being carried upon the front and rear carrier plates, respectively, means for raising the front and rear lift platforms from the respective front and rear carrier plates to engage said end members and raise the rack off the supporting surface for transport on the dolly, the front and rear carrier plates having undersides facing the supporting surface, spaced wheels on the underside of said rear carrier plate for rollingly engaging the supporting surface, a transversely spaced pair of swivel plates mounted for pivoting movement on the underside of the front carrier plate, wheels mounted beneath each said swivel plate for rollingly engaging the supporting surface, a tongue pivotably affixed to the front carrier plate, and tie bar means connecting each swivel plate to the tongue whereby the swivel plates pivot in unison in response to pivoting swinging movement of the tongue for steering the transport dolly.

2. A system for transporting sheets of material as claimed in claim 1, wherein the means for raising the front and rear lift platforms comprises inflatable air bag means between the front lift platform and carrier plate and between the rear lift platform and carrier plate.

3. A system for transporting sheets of material as claimed in claim 2, including frame members affixed to the front and rear carrier plates defining upwardly opening cavities within which the air bag means are disposed.

4. A system for transporting sheets of material as claimed in claim 3, including a transversely spaced pair of the upwardly opening cavities upon each of the front and rear lift platforms, and a separate inflatable air bag means disposed within each of the cavities.

5. A system for transporting sheets of material as claimed in claim 4, including a manifold means, and means pneumatically coupling each of the air bag means to the manifold means for simultaneous inflation and deflation of the individual air bag means.

6. A system for transporting sheets of material as claimed in claim 5, wherein the manifold includes valve means for selectively placing the air bag means in pneumatic communication with the manifold for simultaneous inflation and deflation and for pneumatically isolating the air bag means from the manifold and from one another.

7. A system for transporting sheets of material as claimed in claim 2, including guide posts depending downwardly from the lift platforms, and mating openings extending through the carrier plates slideably receiving the guide posts for guiding the upward and downward movement of the lift platforms.

* * * * *